United States Patent

[11] 3,561,777

| [72] | Inventor | Harry F. Geis<br>Willow Glenn Drive, Kalispell, Mont. 59901 |
|---|---|---|
| [21] | Appl. No. | 814,540 |
| [22] | Filed | Apr. 9, 1969 |
| [45] | Patented | Feb. 9, 1971 |

[54] BICYCLE WITH SUPPORT SKIS
7 Claims, 6 Drawing Figs.

[52] U.S. Cl. .................................................. 280/7.12
[51] Int. Cl. ..................................................... B62k 13/00
[50] Field of Search .......................................... 280/7.12, 12.14, 12.13, 7.14; 9/310

[56] References Cited
UNITED STATES PATENTS

| 573,034 | 12/1896 | Peterson .................... | 280/7.12 |
| 773,959 | 11/1904 | Meissner .................... | 280/7.12 |

FOREIGN PATENTS

| 76,384 | 3/1917 | Switzerland ................ | (280/7.12) |

Primary Examiner—Banjamin Hersh
Assistant Examiner—Robert R. Song
Attorneys—Clarence A. O'Brien & Harvey B. Jacobson ABSTRACT: An attachment for a two-wheeled bicycle including a pair of upstanding front fork extension arms for securement to the lower ends of the legs of the fork and including, alternately, a forward ski or float supported from their lower ends upon and to which the front wheel of an associated bicycle may rest and be secured. The attachment also includes a pair of upstanding rear support legs for securement, in downwardly divergent relation, to the opposite sides of the rear portion of a bicycle frame and which are each provided with, alternately, a ski or float at its lower end.

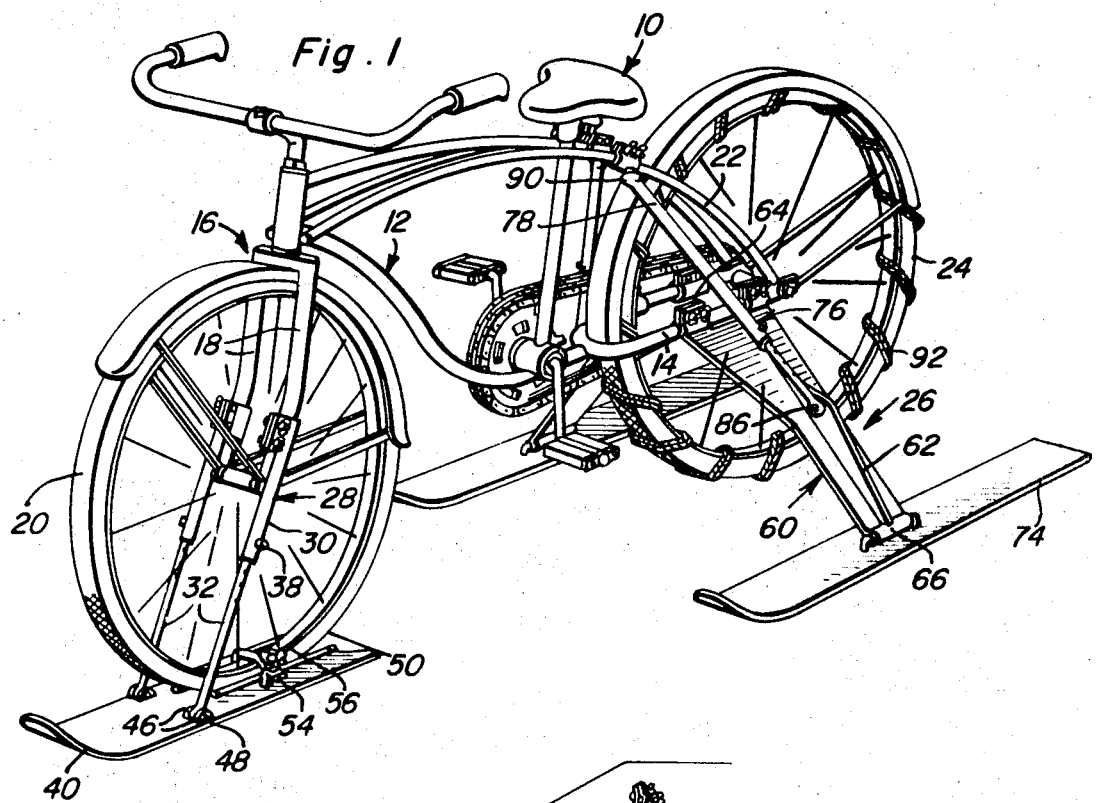
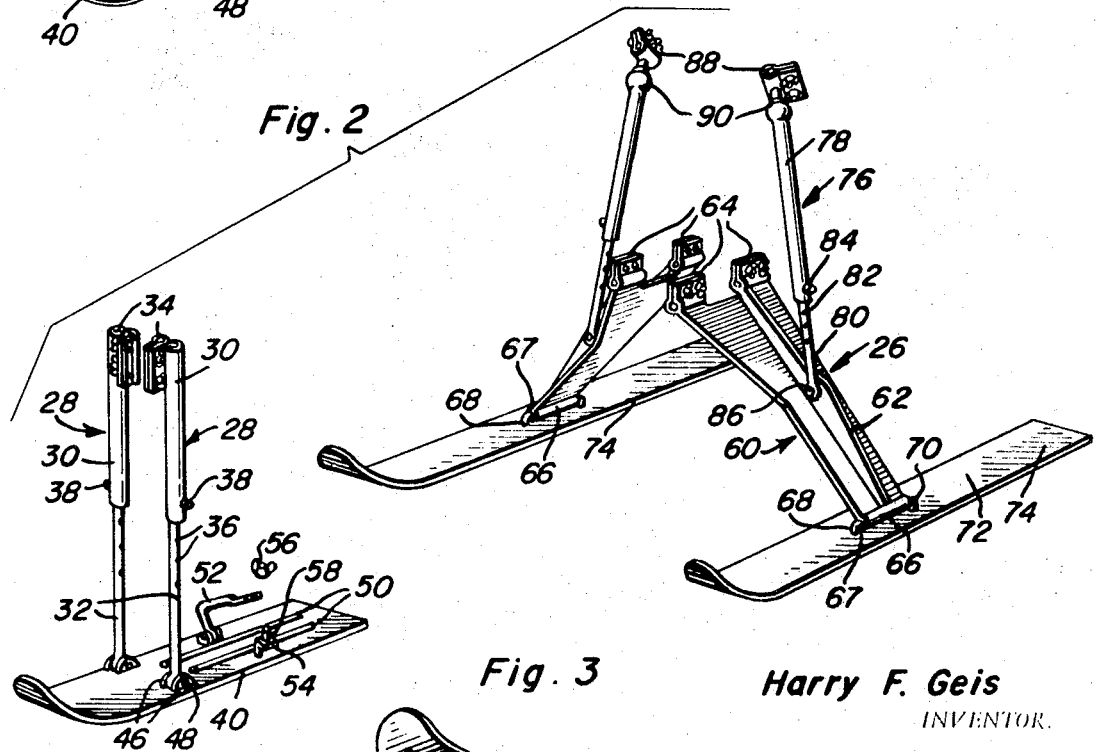
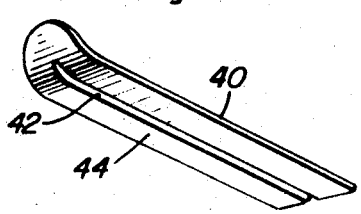

PATENTED FEB 9 1971

3,561,777

Harry F. Geis
INVENTOR.

BY Clarence A O'Brien
and Harvey B. Jackson
Attorneys

BICYCLE WITH SUPPORT SKIS

The attachment of the instant invention has been primarily designed to provide a means whereby a conventional bicycle may be converted for use on snow or water.

Many persons who enjoy sports own bicycles and cycle for exercise and enjoyment. However, in some areas during winter months the ground, as well as many streets, is covered with snow and/or ice and riding a two-wheeled vehicle, such as a bicycle, on snow or ice can be very dangerous. In addition, some persons who enjoy cycling during the warmer seasons of the year also envoy water sports. Accordingly, the attachment of the instant invention has been designed to provide a means for readily converting a bicycle for safe travel over snow or use as a water vehicle.

The main object of this invention is to provide an attachment for a bicycle that may be readily utilized to convert the bicycle for use on snow or on water, as desired.

Another object of this invention, in accordance with the immediately preceding object, is to provide an attachment which may be quickly secured to substantially all conventional types of bicycles and likewise readily removed therefrom, when desired.

Still another object of this invention is to provide an attachment in accordance with the preceding objects which may be readily adjusted to fit various size bicycles.

Another object of this invention is to provide an attachment in accordance with the preceding objects and which may be attached and removed from an associated bicycle frame with a minimum amount of effort and with conventional household handtools.

A final object of this invention to be specifically enumerated herein is to provide an attachment which may be utilized to convert a bicycle into a water vehicle or a snow vehicle and which will conform to conventional forms of manufacture, be of simple construction and easy to use so as to provide a device that will be economically feasible, long lasting and relatively trouble-free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of a bicycle upon which an attachment constructed in accordance with the present invention has been mounted in order to convert the bicycle into a snow vehicle;

FIG. 2 is a perspective view of the attachment illustrated in FIG. 1;

FIG. 3 is a perspective view of one of the ski members of the attachment illustrated in FIGS. 1 and 2;

Figure 4:
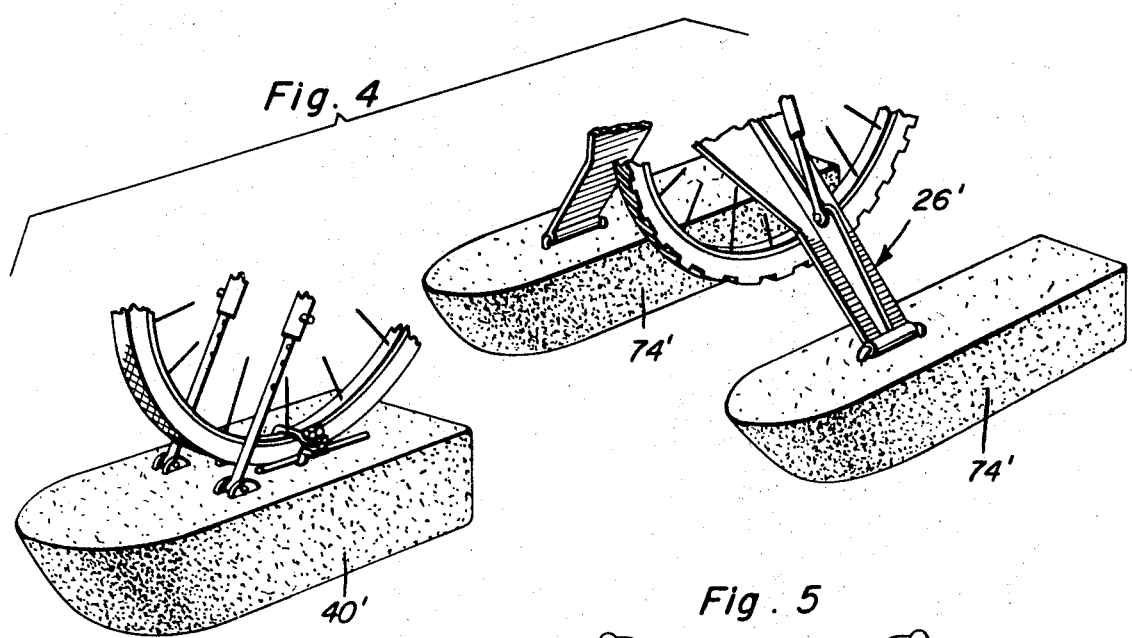
FIG. 4 is a fragmentary perspective view similar to FIG. 1 and illustrating an attachment constructed in accordance with the present invention for converting an associated bicycle into a water vehicle.
Figure 5:
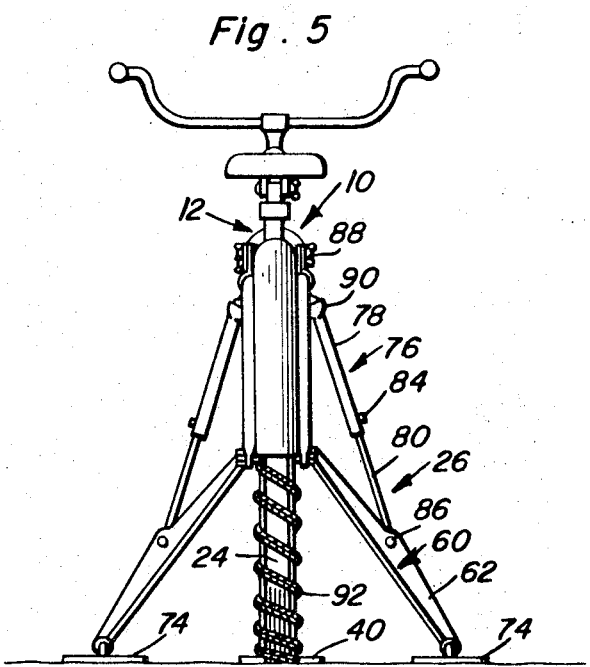
FIG. 5 is a rear elevational view of the assemblage illustrated in FIG. 1.
Figure 6:
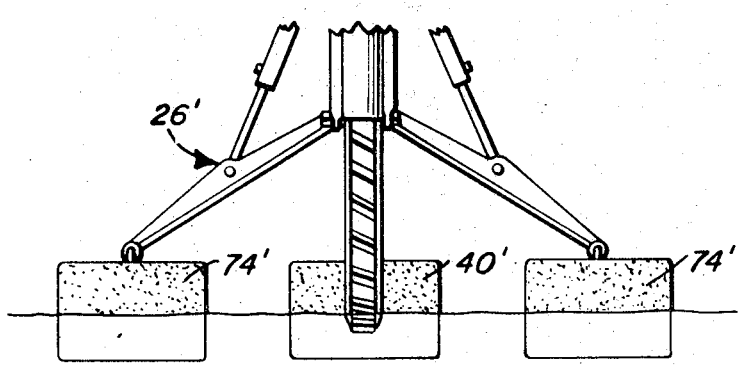
FIG. 6 is a rear elevational view of the assemblage illustrated in FIG. 4.

Referring now more specifically to the drawings, the numeral 10 generally designates a conventional form of bicycle including a frame referred to in general by the reference numeral 12. The frame 12 includes opposite side lower and rearwardly directed frame portions 14 and a front fork assembly referred to in general by the reference numeral 16. The front fork assembly 16 includes a pair of upstanding generally parallel legs 18 between the lower ends of which the front wheel 20 of the bicycle 10 is journaled. In addition, the frame 12 also include upper opposite side rearwardly and downwardly inclined portions 22 whose lower ends are secured to the rear terminal ends of the corresponding frame portions 14 and a rear wheel 24 is journaled between the rear ends of the frame portions 14.

With attention now invited more specifically to FIGS. 1 and 2 of the drawings, the first form of attachment of the instant invention may be seen to be generally designated by the reference numeral 26. The attachment 26 includes a pair of upstanding generally parallel extension arms referred to in general by the reference numerals 28. Each of the extension arms 28 includes upper and lower sections 30 and 32 and the upper sections 30 are tubular and have split clamp members or assemblies 34 secured to their upper terminal ends. The lower end portions of the extension arms 28 are rodlike in configuration and are telescoped upwardly into the lower ends of the corresponding upper end portions 30. The lower ends 32 include longitudinally spaced transverse bores 36 registrable with removable pins 38 carried by the lower terminal ends of the upper end portions 30 and which may be inserted in selected bores 36 to releasably retain the lower end portions 32 in adjusted extended positions.

A front ski member 40 is provided and includes a downwardly opening longitudinal groove 42 in its undersurface 44. The ski member 40 includes pairs of opposite side apertured mounting ears 46 which project upwardly from the upper surface of the ski member 40 and the lower end of each lower end portion 32 is pivotally secured between the corresponding pair of mounting ears 46 by means of a pivot fat fastener 48.

The front ski member 40 includes a pair of laterally spaced upstanding and longitudinally extending ribs 50 which are disposed rearwardly of the mounting ears 46 and an L-shaped holddown lever 52 is pivotally supported from one marginal edge portion of the ski member 40 and includes a slotted free end portion which may be secured to an upwardly projecting abutment 54 carried by the other side of the ski member 40 by means of a wing nut 56 threaded on an externally threaded shank 58 projecting upwardly from the abutment 54 and receivable through the slotted free end of the L-shaped lever 52.

The attachment 26 also includes a pair of upstanding downwardly divergent support legs referred to in general by the reference numerals 60 and each of the support legs 60 is generally panellike in configuration and includes a longitudinally extending stiffening rib 62. A pair of split clamp assemblies 64 are secured to the upper ends of each of the support legs 60 and the lower end of each support leg 60 defines a journal portion 66 through which the upper horizontal bight portion 67 of an inverted U-shaped member 68 is received. Each of the U-shaped members includes a pair of short depending legs 70 which are secured to the upper surface 72 of a corresponding rear ski member 74 at points spaced longitudinally therealong. Accordingly, the ski members 74 are oscillatably supported from the lower ends of the support legs 60 for swinging about axes generally paralleling and disposed above the longitudinal centerlines of the ski members 74.

A pair of elongated brace arms are referred to in general by the reference numerals 76 and include upper and lower end portions 78 and 80. The brace arms 76 include bores 82 in their lower end portions 80 similar to the bores 36 and stop pins 84 similar to pins 38 whereby the effective lengths of the brace arms 76 may be varied. The lower ends of the lower end portions 80 are pivotally secured to the corresponding stiffening ribs 62 by means of pivot fasteners 86 and the upper ends of the upper end portions 78 include split clamp assemblies 88 which are universally supported from the upper end portions 78 by means of ball-and-socket joints 90.

In operation, when it is desired to use the attachment 26, the extension arms 28 have their upper ends clamped to the lower ends of the legs 18 by means of the clamp assemblies 34. The lower periphery of the front wheel 20 is received between the ribs 50 and the L-shaped member 52 is passed over the lower periphery of the wheel 20 between adjacent spokes and secured to the abutment 54 by means of the wing nut 56. In addition, the upper ends of the support legs 60 are clamped to the frame portions 14 by means of the clamp assemblies 64 and the upper ends of the brace arms 76 are clamped to the frame portions 22 by means of the clamp assemblies 88.

Of course, the clamp assemblies 34 may be slightly longitudinally shifted along the legs 18 and the effective length of the extension arms 28, determined by the pins 38, may be adjusted so as to adapt the extension arms 28 to a bicycle having a front wheel of a specific diameter. In addition, the clamp assemblies 64 may be only partially tightened while the effective length of the brace arms 76 is similarly adjusted in order to maintain the lower periphery of the rear wheel 24 in generally the same horizontal plane as that containing the undersurface portions of the ski members 74. Thereafter, the clamp assembly 64 may be tightened.

With attention now invited more specifically to FIG. 4 of the drawings, there may be seen a second attachment referred to in general by the reference numeral 26' and which is substantially identical to the attachment 26 except that it is provided with a front float 40' in lieu of ski member 40 and opposite side rear floats 74' in lieu of the ski members 74. Otherwise, the attachments 26 and 26' are identical.

With attention again invited to FIG. 1 of the drawings, it may be seen that a rope 92 may be spiralled about the rim and tire portions of the wheel 24 in order to afford traction when the bicycle 10 is used on snow. In addition, the wheel 24 may be provided with a tire having deep cross-grooves cut therein when the attachment 26' is to be used. Also, a modified rear wheel may be utilized on the bicycle 10 provided with paddle wheel blades as opposed to a tire when the attachment 26' is used.

Further, it will be noted that the L-shaped member, when the wing nut 56 is tightened, acts as a clamp to tightly clamp the lower periphery of the front wheel 20 to the ski member 40. In addition, the ski members 74 are also provided with grooves, not shown, corresponding to the groove 42. Finally the split clamp assemblies 64, when loosened, pivotally secure the support legs 60 from the frame portions 14 and therefrom enable the support legs 60 to be secured to the frame 12 in relative angularly adjusted positions.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. An attachment for a bicycle, said attachment including an elongated upstanding support arm, the upper end of said arm including means adapted for removable securement to the horizontal, lower and rearwardly projecting rear side frame portion of a bicycle with the support arm projecting downwardly and outwardly from the outer side of said frame portion, an elongated ski member pivotally secured, intermediate its opposite ends, to the lower end of said support arm for oscillation about a horizontal axis extending longitudinally of the ski, and an inclined brace arm having its lower end pivotally secured to said support arm intermediate its opposite ends for angular displacement about a horizontal axis generally paralleling the last mentioned axis and extending transversely of said brace and support arms, and attaching means carried by the upper end of said brace arm for attaching said arm to an adjacent upper rear side portion of said frame.

2. The combination of claim 1 wherein said attaching means is universally supported from the upper end of said brace arm.

3. In combination with a bicycle of the type including a frame provided with lower horizontal rearwardly projecting opposite side portions between which a rear wheel is journaled, upper rearwardly and downwardly inclined opposite side portions whose lower ends are secured to the rear ends of the corresponding lower portion and a front fork assembly oscillatable about an upstanding axis and including a pair of upstanding generally parallel legs between whose lower ends a front wheel is journaled, an attachment including a pair of generally parallel upstanding extension arms removably secured at their upper ends to the lower ends of said legs and defining downward extensions thereof, a first elongated support member secured to the lower ends of said extension arms and with said support member extending rearwardly from said lower ends beneath the lower periphery of said wheel, clamp means clamping said lower periphery to said support member rearwardly of said horizontal axis, said attachment further including a pair of downwardly divergent support legs, means securing the upper ends of said support legs to said lower opposite side portions, second and third elongated support members secured, intermediate their opposite ends, to the lower ends of said support legs with said second and third support members being horizontal, paralleling each other, and disposed generally normal to a line extending between the lower ends of said support legs.

4. The combination of claim 3 wherein said extension arms include means for adjusting their effective length.

5. The combination of claim 3 including a pair of upstanding brace arms having their upper ends secured to said upper opposite side portions and their lower ends secured to said support legs intermediate their upper and lower ends.

6. The combination of claim 3 wherein said support members comprise elongated floats.

7. The combination of claim 3 wherein said support members comprise elongated ski members.